Aug. 24, 1926.
C. M. LOWTHER
1,597,084
NONGLARE SCREEN
Filed Nov. 1, 1924   3 Sheets-Sheet 2
FIG. III.
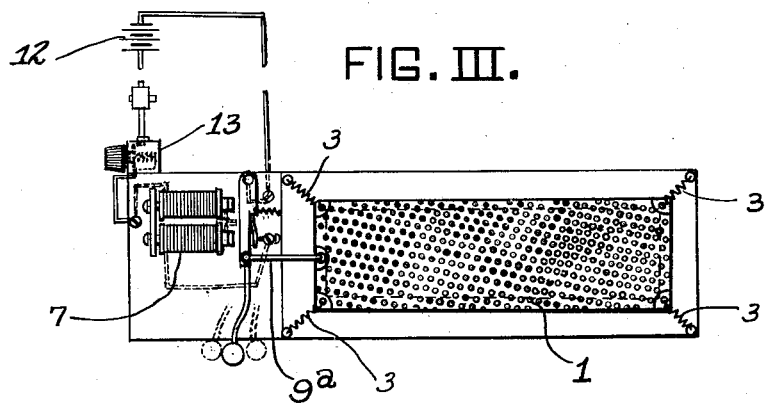
FIG. IV.
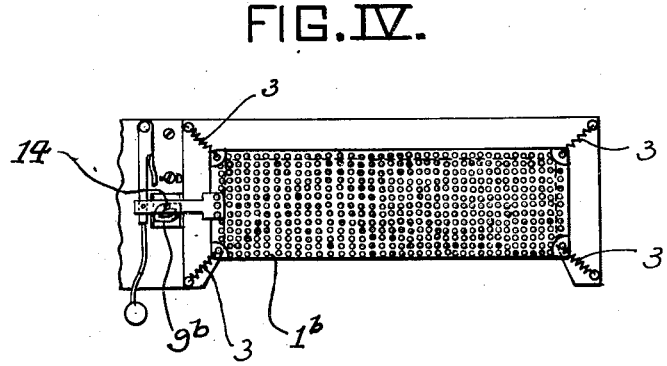
FIG. V.
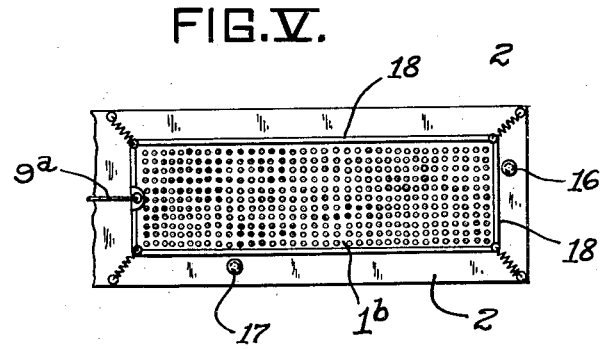
FIG. Vª.
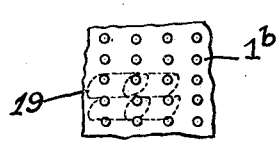
INVENTOR.
CHRISTOPHER M. LOWTHER
BY
ATTORNEY.

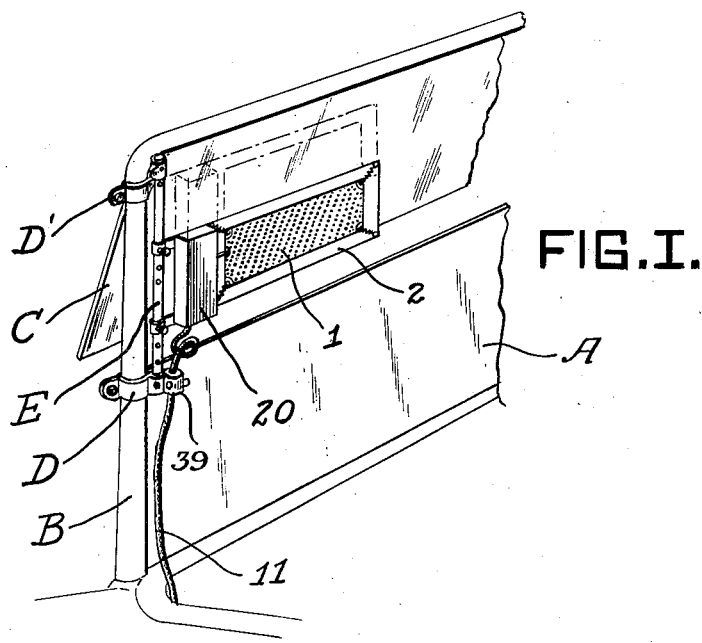
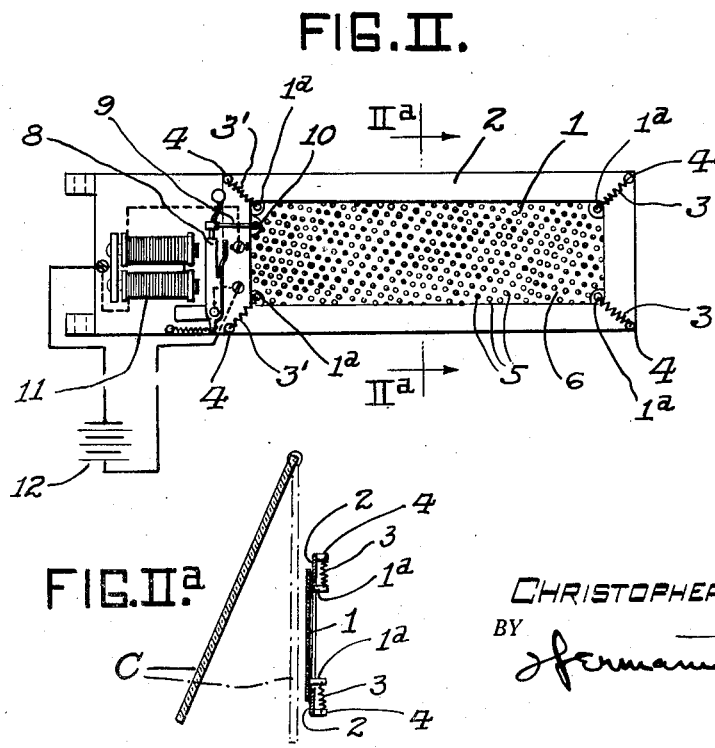

Aug. 24, 1926.
C. M. LOWTHER
1,597,084
NONGLARE SCREEN
Filed Nov. 1, 1924  3 Sheets-Sheet 3
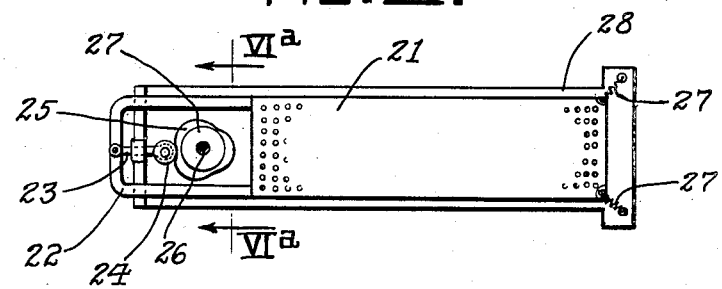
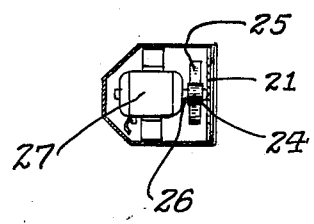
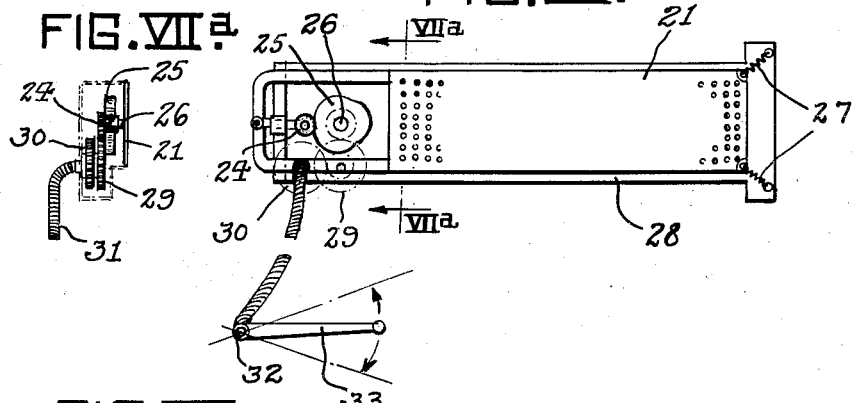
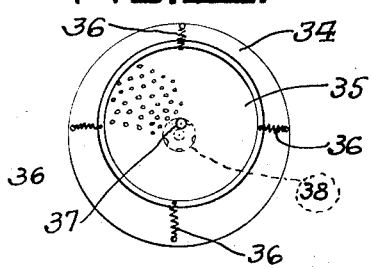
INVENTOR.
CHRISTOPHER M. LOWTHER
BY
ATTORNEY.

Patented Aug. 24, 1926.

1,597,084

UNITED STATES PATENT OFFICE.

CHRISTOPHER M. LOWTHER, OF NEW YORK, N. Y.

NONGLARE SCREEN.

Application filed November 1, 1924. Serial No. 747,177.

This invention relates to screens to prevent the effect of a glare on the eye by a more or less distant source of light, such as headlights on approaching automobiles when viewed by the driver of a car. In particular, it may take the form of an accessory to be attached to an automobile and to be used when desired, by suitable support, for the purpose of cutting out the glare but still to permit a clear vision of the zone around the source of glare. In particular it provides for eliminating the glare in the eyes of a car driver, from approaching headlights, or sun or sun reflections, or may be used to reduce very bright light, and at the same time permit a clear vision through the screen so that the approaching or distant object may be clearly seen by the observer.

Among the objects are to produce a device of simple construction and low cost, durable, and functioning reliably, and which may be readily attached to a support for its proper use, or may be adjusted to suit the requirements of any particular observer or operator, and may be readily shifted when its use is not desired or needed.

In a copending application filed September 28,. 1923, the basis of the invention has been described, and this application involves more particularly the non-glare screen and its control and operation with particular reference to the virbrating and means for vibrating the screen, while other features of novelty will be evident from the more detailed description referring to the accompanying drawings, in which particular embodiments of my invention are shown:—

Fig. I is a perspective of the rear side of an automobile windshield showing the screen in place.

Fig. II is an elevation of the non-glare device on a larger scale, with screen and operating mechanism.

Fig. II$^a$ is an end section showing screen and windshield relative position.

Fig. III is an elevation of the device with a buzzer and electrical means for vibrating and control.

Fig. IV is an elevation of screen with modified form of mechanical connection from a buzzer.

Fig. V is an elevation of a screen with modification for movement control.

Fig. V$^a$ is a fragmentary enlarged elevation of modified movement.

Fig. VI is an elevation of the device with a cam vibrator.

Fig. VI$^a$ is a section on line 6$^a$—6$^a$, of Fig. VI, showing motor arrangement for actuating the cam.

Fig. VII is an elevation of the device with cam mechanism connected for remote control.

Fig. VII$^a$ is a section on line 7$^a$—7$^a$ of Fig. VII.

Fig. VIII is an elevation of a modified form of screen.

In Fig. I the windshield A has the frame or stanchion B, and an outwardly hinged upper windshield section C. To the stanchion B or corresponding rigid part of the vehicle, clamps D—D' hold a rod E which carries sliding bearings of the non-glare device as illustrated. The non-glare device so mounted may be slid upward to the dotted position out of range of the line of vision, or may be swung around the shaft E bringing it parallel to the direction of movement of the vehicle, and thereby entirely out of interference of vision, and the device may be adjusted to different heights for the convenience of different persons, after the supporting shaft has been rigidly secured by brackets D—D'. The mounting of the non-glare device may be much varied, while this case is addressed more particularly to the actuation of the device when suitably mounted in any manner desired.

The non-glare device comprises the screen 1 supported on a frame 2 by springs 3—3 3'—3', which engage the points in the periphery of the screen 1, and being put in tension are held at their other end by pins 4—4 4—4 on the frame, so that the screen 1 may be said to be floating subject to the tension of the springs which permit its movement principally in the plane of the screen, and are particularly adapted to allow a rapid vibration due to mechanism hereafter described, with the spring tension constantly tending to keep the screen flat. The screen is made of light, thin material, and has a plurality of clear-vision spots 5 with intervening space 6, which is less transparent or opaque, so that when at rest a clear view is seen through the plurality of spots or spaces 5, and as the screen is vibrated, when the observer's eyes are focused on an object beyond the screen, the movement of the intervening opaque space will momentarily interrupt the vision, which is renewed when the vibration brings the clear spot or aperture in register again. A vibration of something in the order of 15 per second it is found results in a persistency of vision through the clear spots, so as to give a clear view of the object beyond the screen, while the fraction of time when the opaque or sub-transparent area is interposed, cuts off a degree of light, as may be determined, to such an extent as to entirely prevent objectionable glare, but still assure the clear vision by the observer of the object viewed. The relative size of the clear spots or holes in the screen compared with the sub-transparent or opaque portions will depend upon the relative distance from the observer's eyes for positioning the screen, and the degree of glare to be eliminated. For certain particular purposes it may be desirable to superpose two thin screens in a manner that would permit their relative adjustment in order to vary the size of the clear-vision apertures, to meet the varying conditions of intensity of glare, which further refinement may be made as just described.

With the yieldingly suspended screen, vibration thereof may be accomplished in various ways. In Figs. II, III and IV, a buzzer 7 is used. The coils and armature connected in the usual way with the contacts to provide quick vibration of the armature 8, which is connected with link 9 by pin connection 10 with the adjacent edge of the screen. For purposes of illustration, only typical parts of buzzer are shown without detail of connections, while the wires 11 of the circuit for actuating the buzzer lead to a battery 12 which may be mounted anywhere convenient, as in a car, or any other suitable source of current may be used with the usual connections.

In the form shown in Fig. III, a rheostat 13 serves the purpose of controlling the current to the coils, and thereby varying the rate of vibration of the buzzer, and by the link 9ª pinned to the screen, varying the vibration of the screen. In Fig. IV the screen connection, from the buzzer, is a bar 9ᵇ, with a fixed attachment to the edge of the screen 1ª and having a guide, such as a pin 14, engaging a slot 15, so as to control the oscillatory movement of the rod 9ᵇ, and therefore of the screen. In Fig. V the frame 2 has stops 16—17 forming a cushioning buffer, with which a stiff beading 18 on the screen may engage so as to limit the amplitude of motion of the screen vibration, and if desired be so arranged as to cause a complex vibratory oscillation of the screen in its plane. One form of vibratory oscillation is indicated in Fig. Vª, where the fragmentary part of the screen has indicated thereon the relatively smaller spots or holes compared with the intervening spaces of sub-transparency or opaque. The dotted lines 19 indicated thereon the oscillatory motion of any particular points, such as the clear-vision spots on the screen, when a compound vibration in the plane of the screen is provided.

In Fig. IIª the cross-section shows the position of the frame 2 with the screen 1 and the spring suspension, keeping the device in a vertical position in the line of vision of an observer, while the upper windshield plate is hinged forward as indicated in Fig. I. In this view the screen is shown in front of the frame with pins 1ª projecting through the frame aperture for the attachment of the springs, so that the screen thus mounted will vibrate without the observer seeing the movement of the edges of the screen. In the preferred form, as shown in the other views, the tension springs are in the same plane as the screen, because of the thinness of the screen and flexibility, which require that the tension of the springs as well as the vibrating impulses be preferably confined to the plane of the screen. Suitable covering of all the mechanism may be made in the finished article for protection of all moving parts, and the vibratory means may be housed in a separate case, as 20, Fig. I.

In Figs. VI–VII, the screen 21 has a tension strip 22 connected with a plunger 23 having a roller 24 engaging a cam 25 on shaft 26, operated by motor 27 shown in Fig. VIª. The tension springs 27 carried on frame 28, pull the roller 24 against the cam and when the latter is rotated at high speed, through the medium of the plunger and bracket 22, the screen is vibrated as desired in its plane. In the form shown in Fig. VII, the cam is actuated by gears 29—30, and suitable pinions connecting with the cam-shaft 26, so that a flexible shaft 31 carried to a bearing 32 with hand-lever 33, may be actuated manually to drive the cam at a high speed so as to vibrate the screen voluntarily and at any desired rate. The flexible shaft may be suitably connected with any moving part conveniently located, thus affording remote operation and control mechanically.

Fig. VIII is a modified form of screen, in which a plate 34, such as glass, carries a screen 35 in circular form suspended by tension springs 36, while a pin 37 in the screen connects with a small disc 38 on the plate 34, so as to guide the screen in an oscillatory motion. The disc may be driven by any suitable means least interfering with the vision through the screen, or the disc may simply control the motion of the screen with vibratory effect impressed upon the rim.

The screen used in connection with the non-glare device described herein, may be in general a yieldingly supported screen, as set forth in my prior application above cited. In its preferred form the relatively long narrow screen, with a plurality of small holes regularly arranged, with intermediate opaque or sub-opaque space or area, serve very effectually in practice, and it has been demonstrated that the arrangement of holes as indicated in Figs. II and III, provide for the cutting out of glare and permitting clear vision of the objective, to the best advantage. Depending upon the direction of vibration, the arrangement of holes may be varied, but the staggered or slightly inclined rows of holes effectively serve the purpose when the vibration is horizontal, except for the modification due to the floating spring support. Instead of metal springs, the use of elastic rubber ties of a suitable length likewise serve the purpose of permitting suitable vibration. For the persistency of vision to assure clear visibility through the screen, with the reduction of elimination of glare, a vibration at a rate of upwards of ten per second is entirely effective. By means of regulating the rate of vibration, as by means indicated in Fig. III, adjustment to suit particular conditions or to get the best result with certain ratios of clear vision spots with respect to the balance of the area less transparent or opaque, can be definitely settled for the standard characteristics for the salable article.

The supporting frame around the screen may be arranged so as to minimize or eliminate entirely the interference of the opaque frame with respect to one side such as the bottom, see Fig. IV and in this manner the position of the screen before the observer would be adjusted so that a slight declination of the head would permit viewing the road in front clear of the screen, at any moment desired. The framework may, however, be made of transparent material so that the entire border around the vibrating screen will offer no interference to direct and normal vision, or the frame to an extent necessary for proper support of the screen may be more remote leaving the non-glare screen portion clear of any surrounding obstacle or parts to interfere with unobstructed vision on all sides of the screen.

It will be understood that it is not necessary to maintain the screen in vibration except when required, and for convenience therefore a suitable switch, such as 39, in the case of the electrically operated device, may be positioned accessible to the driver either in proximity, as shown, to the device, or it may be placed adjacent the steering wheel for remote control.

Various means of actuating the device, besides those herein specifically shown and described, may be used, for the purpose of economy or other advantages in detail respecting production, use or durability. I do not confine myself to the precise constructions herein particularly shown, but what I claim and desire to secure by Letters Patent is:—

1. A device to cut off light glare from the eyes of an observer and retain clear vision, comprising a screen having a multiplicity of alternate areas of clear visibility and subtransparency, a support for said screen to hold the same in the line of vision, sensitive yielding means supporting said screen and permitting vibration in its plane, and mechanism to vibrate the screen with respect to its support and in the direction of the plane of the screen.

2. In an automobile the combination of a non-glare screen having alternate areas of clear visibility and sub-transparency, means to yieldingly support the same with respect to a fixed part of the vehicle, mechanism on the vehicle to automatically vibrate the screen transversely to the direction of vision from the vehicle.

3. A non-glare device for automobiles or the like, comprising a screen having a regularly disposed series of clear-vision spots and opaque intervening areas, means for movably supporting said screen on the automobile in the line of vision of an occupant, and mechanism associated with the screen to vibrate it in the plane of the screen.

4. A non-glare device for automobiles or the like, comprising a screen having a regularly disposed series of clear-vision spots and opaque intervening areas of a greater aggregate area than the clear-vision spots, means for movably supporting said screen on the automobile in the line of vision of an occupant, mechanism associated with the screen to vibrate it in the plane of the screen.

5. A non-glare device for automobiles or the like, comprising a screen having a regularly disposed series of clear-vision spots and opaque intervening areas, means for yieldingly supporting said screen on the automobile in the line of vision of an occupant, and electrical means carried on the support of the screen having means of control to regulate the vibration of the screen in its plane.

6. A non-glare device for automobiles or the like, comprising a screen having a regularly disposed series of clear-vision spots and opaque intervening areas, means for yieldingly supporting said screen on the automobile in the line of vision of an occupant, and mechanical means to effect the vibration of the screen and remote control to actuate said mechanism.

7. A non-glare device for automobiles or the like, comprising a screen having a regularly disposed series of clear-vision spots and opaque intervening areas, means for yieldingly supporting said screen on the automobile in the line of vision of an occupant, mechanism to impart vibratory motion to the screen in one direction and a tension device to pull the screen in the opposite direction.

8. A non-glare device for automobiles or the like, comprising a screen having a regularly disposed series of clear-vision spots and opaque intervening areas, means for yieldingly supporting said screen on the automobile in the line of vision of an occupant, a plurality of tension devices pulling the screen in opposite directions, and a vibrating device attached to the screen to vibrate it in its plane.

9. A screen to prevent a glare in the eye by interposition in the line of vision, a support for said screen to hold the same relatively close to the eye compared with the source of glare, a plurality of clear-vision spots on said screen interconnected by areas of opaque or sub-transparent material, and an electrical buzzer and mechanical connections with the screen to vibrate the latter in its plane.

10. A screen to prevent a glare in the eye by interposition in the line of vision, a support for said screen to hold the same relatively close to the eye compared with the source of glare, a plurality of clear-vision spots on said screen interconnected by areas of opaque or sub-transparent material, and controlled means to vibrate the screen in its plane at a predetermined periodicity.

11. A device to cut off glare light from the eyes of an observer and retain clear vision, comprising a screen having a plurality of clear-vision spots and interconnecting areas less clear or opaque, means of support for said screen permitting motion and guiding same in the direction of its plane, and mechanism to vibrate the screen.

In testimony whereof, I have signed my name to this application this 29th day of October, 1924.

CHRISTOPHER M. LOWTHER.